United States Patent
Deng et al.

(10) Patent No.: US 11,983,376 B2
(45) Date of Patent: May 14, 2024

(54) TOUCH FRAME WITH ARRANGEMENT OF PRINTED CIRCUIT BOARD AND TOUCH SCREEN HAVING THE SAME

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Meiming Deng, Guangzhou (CN); Jianhui Cao, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 17/827,635

(22) Filed: May 27, 2022

(65) Prior Publication Data
US 2022/0291767 A1    Sep. 15, 2022

Related U.S. Application Data

(63) Continuation of application No. PCT/CN2020/106342, filed on Jul. 31, 2020.

(30) Foreign Application Priority Data

Nov. 29, 2019    (CN) .......................... 201922131417.2

(51) Int. Cl.
*G06F 3/046*    (2006.01)
*G06F 3/041*    (2006.01)

(52) U.S. Cl.
CPC ............ *G06F 3/046* (2013.01); *G06F 3/0412* (2013.01); *G06F 2203/04107* (2013.01)

(58) Field of Classification Search
CPC .................. G06F 3/046; G06F 3/0412; G06F 2203/04107
See application file for complete search history.

(56) References Cited

U.S. PATENT DOCUMENTS

2016/0109907 A1*  4/2016  Cao ........................ G06F 1/1626
                                                                    345/175
2022/0276734 A1*  9/2022  Fu .......................... G06F 1/1637

FOREIGN PATENT DOCUMENTS

CN    202472612 U    10/2012
CN    205942654 U    2/2017
(Continued)

OTHER PUBLICATIONS

International Search Report issued in corresponding international application No. PCT/CN2020/106342, dated Nov. 10, 2020, 5 pages.
(Continued)

*Primary Examiner* — Lisa S Landis
(74) *Attorney, Agent, or Firm* — BAYES PLLC

(57) ABSTRACT

A touch frame and a touch screen having the same. The touch frame includes an outer frame, a light filtering member, and a printed circuit board. The outer frame has an accommodating groove having at least one groove opening, and the light filtering member is arranged in the accommodating groove. The light filtering member is provided with an accommodating cavity, and a part of the light filtering member extending to the groove opening of the accommodating groove is a light filtering portion. The printed circuit board is arranged in the accommodating cavity. A light receiving/transmitting device is provided on the printed
(Continued)

circuit board, and the light receiving/transmitting device is directly opposite to the light filtering portion.

19 Claims, 12 Drawing Sheets

(56) References Cited

FOREIGN PATENT DOCUMENTS

| CN | 207571986 U | 7/2018 | |
|---|---|---|---|
| CN | 209000411 U | 6/2019 | |
| CN | 210605673 U | 5/2020 | |
| WO | WO-2019054524 A1 * | 3/2019 | ............... G02B 5/28 |
| WO | WO-2020078339 A1 * | 4/2020 | ............. G06F 3/042 |

OTHER PUBLICATIONS

Written opinion of the International Searching Authority issued in corresponding international application No. PCT/CN2020/106342, dated Nov. 10, 2020, 4 pages.

* cited by examiner

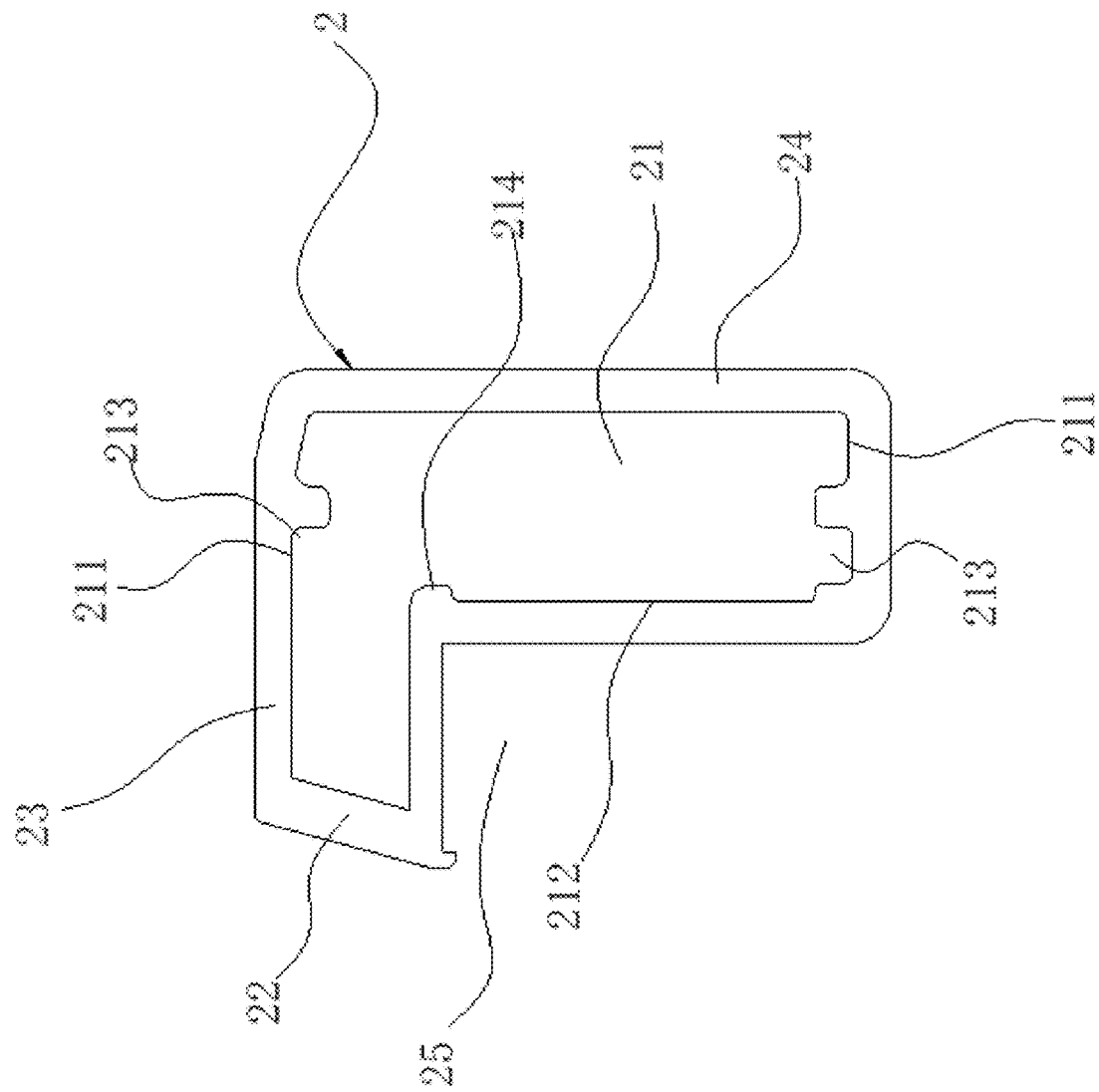

TOUCH FRAME WITH ARRANGEMENT OF PRINTED CIRCUIT BOARD AND TOUCH SCREEN HAVING THE SAME

CROSS-REFERENCE TO RELATED APPLICATION

The present application is a continuation of International Application No. PCT/CN2020/106342, filed on Jul. 31, 2020, which claims the benefit of priority to Chinese Patent Application No. 201922131417.2, filed on Nov. 29, 2019, both of which are incorporated herein by reference in their entireties.

TECHNICAL FIELD

The present disclosure relates to the technical field of touch screens, and in particular to a touch frame and a touch screen having the same.

BACKGROUND

The infrared touch screen (Infrared Touch Screen Technology) is composed of a display screen and infrared emitting and receiving sensing elements mounted on an outer frame of the display screen, and the infrared emitting and receiving sensing elements form an infrared detection network on a surface of the screen. The realization principle of an infrared touch screen is similar to that of a surface acoustic wave touch screen, which uses infrared emitting and receiving sensing elements, and these elements form an infrared detection network on the surface of the screen. Objects for touch operation (such as fingers) can change infrared rays of contact points, which then are converted into coordinate positions of touch, so as to realize a response of the operation. On the infrared touch screen, a printed circuit board is arranged on four sides of the screen, and the infrared emitting tube and the infrared receiving tube are electrically connected to the printed circuit board to form an infrared matrix crossed horizontally and vertically.

A structure of the existing touch screen has a complicated outer frame structure, high manufacturing cost, time and labor consuming for installation with other structures, and low installation efficiency.

SUMMARY

In a first aspect, a touch frame includes an outer frame having an accommodating groove, where the accommodating groove has at least one groove opening; a light filtering member arranged in the accommodating groove and provided with an accommodating cavity, where a part, extending to the groove opening of the accommodating groove, of the light filtering member is a light filtering portion; and a printed circuit board arranged in the accommodating cavity and provided with a light receiving/transmitting device, where the light receiving/transmitting device is directly opposite to the light filtering portion.

In a second aspect, a touch screen includes a display module and a side frame arranged on a periphery of the display module, where the side frame adopts the touch frame. A printed circuit board of the touch frame is perpendicular to a display side of a cover plate of the display module. The outer frame of the touch frame is provided with an accommodating groove, and a groove opening of the accommodating groove is arranged toward a center of the display module. A light filtering member of the touch frame has a light filtering portion, and the light filtering portion is located between the outer frame and the display side of the cover plate.

BRIEF DESCRIPTION OF THE DRAWINGS

Hereinafter, the present disclosure will be further described in detail based on the drawings and embodiments.

In order to more clearly describe the technical solutions in the embodiments of the present disclosure or the prior art, the drawings that need to be used in the description of the embodiments or the prior art will be briefly introduced hereinafter. It goes without saying that the drawings in the following description are only some embodiments of the present disclosure. For those skilled in the art, without creative work, the drawings of other embodiments can also be obtained based on these drawings.

FIG. 12 is a structural schematic diagram of a light filtering member according to an embodiment of the present disclosure.

In FIGS. 1 to 12:
  100. Touch frame, 1. Outer frame, 11. First frame board, 12. Second frame board, 13. Third frame board, 14. Fourth frame board, 15. Accommodating groove, 2. Light filtering member, 21. Accommodating cavity, 211. First cavity wall, 212. Second cavity wall, 213. Holder, 214. Abutting portion, 215. Buffer pad, 22. Light filtering portion, 23. First part, 24. Second part, 25. Notch, 26. Second opening, 3. Printed circuit board, 4. Light receiving/transmitting device, 5. Adhesive layer, 6. Adapter, 61. First adapter plate, 62. Second adapter plate, 63. Third adapter plate, 64. Fourth adapter plate, 7. Screw, 8. Middle frame, 81. Support portion, 82. Connecting portion, 9. Fixing post, 200. Display module, 210. Cover plate, 220. Backplane, 2201. Bending edge.

DETAILED DESCRIPTION

Figure 1:
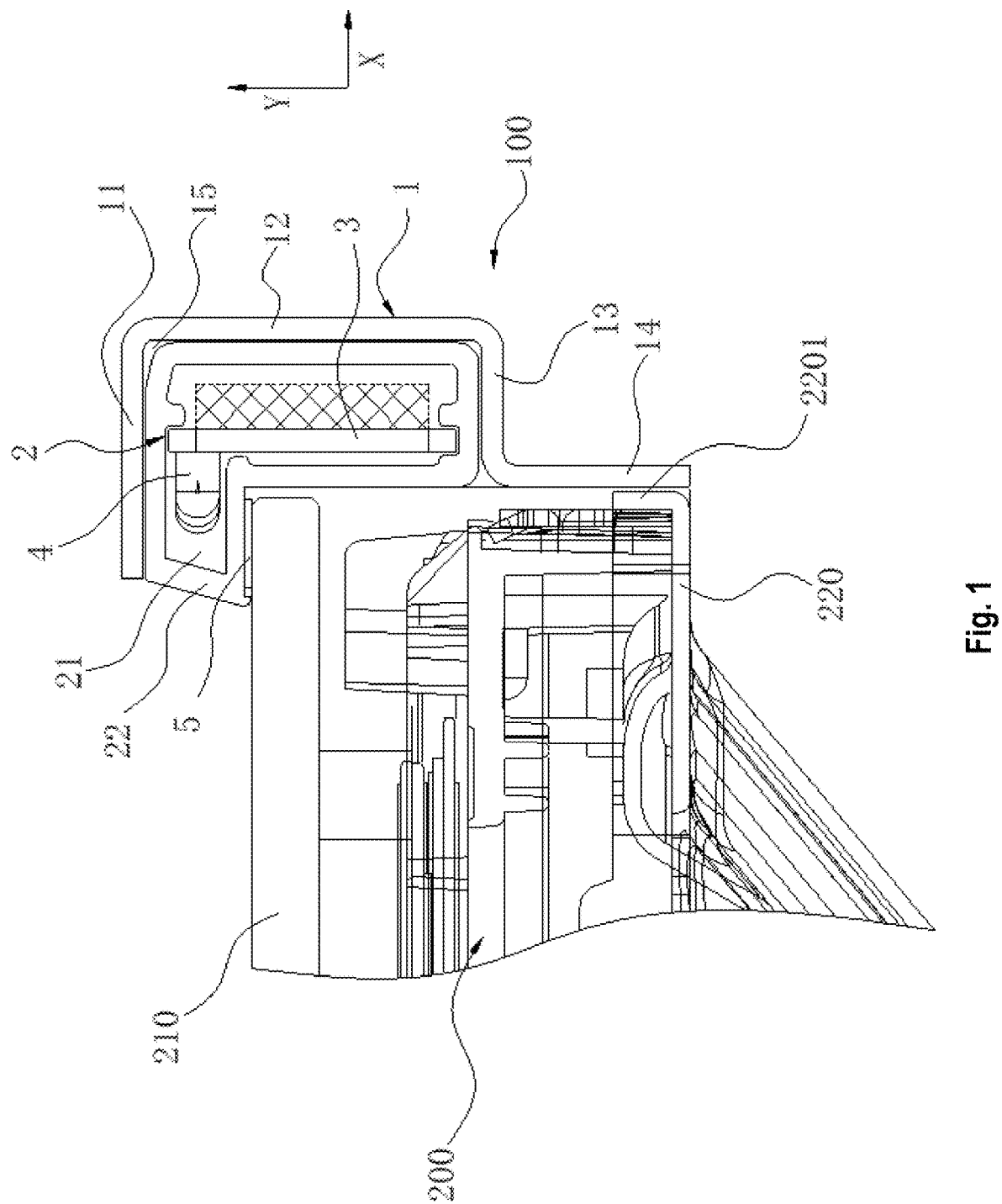
FIG. 1 is a schematic cross-sectional view of a touch screen according to a first embodiment of the present disclosure.

In order to make the technical problems solved by the present disclosure, the adopted technical solutions, and the achieved technical effects more clear, the technical solutions of embodiments of the present disclosure will be described in further detail in conjunction with the accompanying drawings hereinafter. It goes without saying that the described embodiments are only some embodiments of the present disclosure, not all embodiments. Based on the embodiments in the present disclosure, all other embodiments obtained by those skilled in the art without creative work shall fall within the claimed scope of the present disclosure.

In the description of the present disclosure, unless expressly stipulated and limited otherwise, the terms "in connection," "connect," and "fix" shall be interpreted broadly, for example, they may be fixedly connected, detachably connected, or integrated. They may be a mechanical connection or an electrical connection. They may be directly connected or indirectly connected through an intermediate medium, and may be an internal communication between two components or an interaction relationship between two components. For those skilled in the art, the specific meaning of the above-mentioned terms in the present disclosure can be understood under specific circumstances.

In the present disclosure, unless expressly stipulated and defined otherwise, a first feature being "above" or "below" a second feature may include direct contact between the first and second features, or may also include non-direct contact but through other features between the first and second features. Moreover, the first feature being "on," "above," and "on top of" the second feature includes the first feature being directly above and obliquely above the second feature, or it simply means that the level of the first feature is higher than that of the second feature. The first feature being "below," "under," and "beneath" the second feature includes the first feature directly below and obliquely below the second feature, or it simply means that the level of the first feature is smaller than that of the second feature.

In general, terminology may be understood at least in part from usage in context. For example, terms, such as "a," "an," or "the," again, may be understood to convey a singular usage or to convey a plural usage, depending at least in part upon context. Similarly, the use of the singular form of any word may include the plural, depending at least in part upon context, and vice versa.

The beneficial effect of embodiments of the present disclosure is that: by making the light filtering member a structure with an accommodating cavity inside, the printed circuit board can be installed in the accommodating cavity and form a component with the light filtering member, and the component is then installed in the accommodating groove of the outer frame, which can avoid arrangement of an independent slot for fixing the light filtering portion on the outer frame, so as to simplify the structure of the outer frame and reduce the manufacturing cost, and meanwhile realizing the installation and fixation of the light filtering portion without squeezing, thereby effectively preventing the light filtering portion playing a role of a filter function from being scratched, reducing the difficulty of assembly, and facilitating installation and fixation of components, so that it is not prone to shaking, that is, it is not easy to generate machine vibration. In addition, the isolation of the light filtering member can prevent metal debris on the outer frame from falling on the printed circuit board, thereby effectively avoiding the short circuit of the printed circuit board.

The touch screen of embodiments of the present disclosure has a simple structure, convenient assembly, and high structural stability, and the printed circuit board is arranged to be perpendicular to the display side of the cover plate, which can reduce a width of the touch frame while reducing a thickness of the entire touch frame, so as to satisfy design requirements of a narrow side frame.

With reference to FIGS. 1 to 12, an embodiment of the present disclosure provides a touch frame 100, which is used for a touch screen, and the touch screen may be an interactive display device such as an interactive whiteboard and a smart blackboard. In the following example, a display side of the cover plate 210 of the display module 200 is a side surface of the touch screen that presents pictures, videos, and touch operations.

As shown in FIGS. 1 and 12, the touch frame 100 includes an outer frame 1, a light filtering member 2 and a printed circuit board 3. Thereinto, the outer frame 1 has an accommodating groove 15, and the accommodating groove 15 is opened with at least one groove opening towards a center of the display module 200 of the touch screen. The light filtering member 2 is arranged in the accommodating groove 15, and the light filtering member 2 is provided with an accommodating cavity 21, and a part, extending to the groove opening of the accommodating groove 15, of the light filtering member 2 is a light filtering portion 22, and the light filtering portion 22 is located between the outer frame 1 and the display side of the cover 210 of the display module 200. The printed circuit board 3 is arranged in the accommodating cavity 21. A light receiving/transmitting device 4 is provided on the printed circuit board 3, and the light receiving/transmitting device 4 is directly opposite to the light filtering portion 22. By making the light filtering member 2 a structure with an accommodating cavity 21 inside, the printed circuit board 3 can be installed in the accommodating cavity 21 and form a component with the light filtering member 2, and the component is then installed in the accommodating groove 15 of the outer frame 1, which can avoid arrangement of an independent slot for fixing the light filtering portion 22 on the outer frame 1, so as to simplify the structure of the outer frame 1 and reduce the manufacturing cost, and meanwhile realizing the installation and fixation of the light filtering portion 22 without squeezing, thereby effectively preventing the light filtering portion 22 playing a role of a filter function from being scratched, and reducing the difficulty of assembly. And, the component is facilitating installation and fixation, so that it is not prone to shaking, that is, it is not easy to generate machine vibration. In addition, the isolation of the light filtering member 2 can prevent metal debris on the outer frame 1 from falling on the printed circuit board 3, thereby effectively avoiding the short circuit of the printed circuit board 3.

In this embodiment, an adhesive layer 5 is provided on a side surface of the light filtering member 2 close to a display side of the cover plate 210. Fixing the light filtering member 2 by means of adhesive can stably fix the light filtering member 2 on the cover plate 210, which not only avoids the arrangement of the more complicated outer frame 1, but also simplifies the installation of the light filtering member 2, thereby preventing the light filtering portion 22 on the light filtering member 2 and even the entire surface of the light filtering member 2 from being scratched, and meanwhile effectively preventing the light filtering member 2 from shaking and avoiding mechanical vibration. Specifically, the adhesive layer 5 is a double-sided tape.

The adhesive layer 5 can be pasted on the light filtering member 2 or can also be pasted at a designated position on the display side of the cover plate 210 during initial fixation.

Specifically, as shown in FIG. 12, the filter 2 is L-shaped, and includes a first part 23 and a second part 24 arranged at an angle. A notch 25 is formed between the first part 23 and the second part 24, and the light filtering portion 22 is arranged on an end surface of the first part 23 away from the second part 24. A side surface of the first part 23 located in the notch 25 is bonded to the display side of the cover plate 210, and a side surface of the second part 24 located in the notch 25 is spaced apart from or in contact with an end surface of the display module 200. By making the light filtering member 2 include two parts with an angle, the space of the outer frame 1 of the display module 200 in the thickness direction can be used, so as to avoid the increase in the thickness of the display side protruding from the cover plate 210, and reduce the thickness of the touch frame 100 to a certain extent, which facilitates the realization of an ultra-thin design of the entire touch screen.

As shown in FIG. 12, the first part 23 and the second part 24 are vertically arranged. The two parts arranged vertically can form an L-shaped notch 25, thus the two vertical side surfaces of the notch 25 are used to limit the installation of the display module 200.

As shown in FIG. 12, the accommodating cavity 21 of the light filtering member 2 is L-shaped, for example, the first part 23 is provided with a first chamber, and the second part 24 is provided with a second chamber. The first chamber and the second chamber are in communication to jointly form the accommodating cavity 21. The printed circuit board 3 is arranged in the second chamber, and the light receiving/transmitting device 4 is arranged in the first chamber. The L-shaped accommodating cavity 21 can match the structure of the printed circuit board 3 and the light receiving/transmitting device 4, so that the space in the accommodating cavity 21 can be used as much as possible, which avoids large excess space, thereby facilitating the narrow side design of the touch frame 100.

In one embodiment, as shown in FIG. 1, an X direction as shown is the width direction of the touch frame 100, a Y direction is the thickness direction of the touch frame 100, and the direction perpendicular to the X and Y directions is the length direction of the touch frame 100. A side edge of the display module 200 provided with the outer frame 1 is an installation side edge, and the length of the light filtering member 2 extends along the length direction of the installation side edge, that is, the length direction of the light filtering member 2 is consistent with the length direction of the touch frame 100. At least one end of the light filtering member 2 in the length direction is opened with a first opening, the first opening is in communication with the accommodating cavity 21, and the printed circuit board 3 is inserted into the accommodating cavity 21 through the first opening. By arranging the first opening, the printed circuit board 3 can be inserted into the inside of the light filtering member 2 from the end portion of the light filtering member 2 in the length direction, so as to realize installation and fixation, which facilitates the installation of the printed circuit board 3. And meanwhile, the light filtering member 2 with this structure can also shield and protect the printed circuit board 3 in a large area, which can effectively prevent the metal debris or water on the outer frame 1 from falling on the printed circuit board 3 and causing a short circuit of the printed circuit board 3, thereby improving the waterproof and moisture-proof effects of the printed circuit board 3.

It goes without saying that first openings can be provided at both ends of the light filtering member 2 in the length direction, so that the printed circuit board 3 can be mounted from any end of the light filtering member 2 in the length direction.

In order to facilitate the fixation of the printed circuit board 3, each of the two opposite cavity walls of the accommodating cavity 21 are provided with a holder 213. The cavity walls provided with the holders 213 are parallel to the display side of the cover plate 210. The holders 213 extend to the first opening along the length direction of the light filtering member 2. And the opposite ends of the printed circuit board 3 are respectively clamped in the two holders 213 in the respective ends. In some embodiment, the holders 213 can be a stopper in one end and a slot in the other end. In this embodiment, the two holders 213 are arranged at intervals along the Y direction.

In this embodiment, as shown in FIG. 12, the light filtering member 2 is integrally extruded with light-transmitting plastic, so that the holders 213 can be integrally formed, which facilitates the fixation of the printed circuit board 3. And, the outer frame 1 can be made of sheet metal or aluminum profile and other plates, and the processing method can be bending process or extrusion process.

Specifically, the cavity wall provided with the holders 213 is the first cavity wall 211, and the two first cavity walls 211 are arranged along the width direction of the printed circuit board 3. The width direction of the printed circuit board 3 herein refers to the Y direction in FIG. 1, the width direction of the printed circuit board 3 is perpendicular to the display side of the cover plate 210, the thickness direction of the printed circuit board 3 is parallel to the display side of the cover plate 210, and the length direction of the printed circuit board 3 is consistent with the length direction of the light filtering member 2.

The accommodating cavity 21 further includes a second cavity wall 212 perpendicular to the first cavity wall 211, the printed circuit board 3 has a first side surface and a second side surface that are opposite to each other, the light receiving/transmitting device is arranged on the first side surface, and the second cavity wall 212 is arranged on and spaced apart from one side of the first side surface of the printed circuit board 3, the second cavity wall 212 is protrudingly provided with an abutting portion 214, and the abutting portion 214 abuts against the first side surface. The arrangement of the abutting portion 214 can prevent the printed circuit board 3 installed in the holders 213 from shaking.

Furthermore, as shown in FIGS. 1 and 12 (and with reference to FIG. 6), a buffer pad 215 is provided between the abutting portion 214 and the printed circuit board 3. The arrangement of the buffer pad 215 can prevent a rigid collision between the abutting portion 214 and the first side surface of the printed circuit board 3, which damages the circuit structure or the copper layer on the surface of the printed circuit board 3. In one embodiment, the buffer pad 215 is a buffer foam, rubber pad or silicone pad.

Referring to FIGS. 1 to 11, the outer frame 1 of the touch frame 100 can be directly connected with the backplane 220 of the display module 200 by a screw 7, or can be connected with the backplane 220 through a structure such as a fixing post 9, an adapter 6, etc. The following are specific examples of several connection methods.

As shown in FIGS. 1 and 12, the outer frame 1 includes a first frame board 11, a second frame board 12, and a third frame board 13 that are vertically connected in sequence, both the first frame board 11 and the third frame board 13 are located on a side of the second frame board 12 facing the cover plate 210. The first frame board 11 is arranged on and spaced apart from the display side of the cover plate 210, and an accommodating groove 15 is formed among the first frame board 11, the second frame board 12 and the third frame board 13.

A fourth frame board 14 is connected with an end of the third frame board 13 away from the second frame board 12. The fourth frame board 14 and the second frame board 12 are respectively located on the two opposite sides of the third frame board 13. The fourth frame board 14 is provided with a fixing hole for a screw 7 to pass through. An edge of the backplane 220 of the display module 200 is bent with a bending edge 2201, the bending edge 2201 is parallel to the fourth frame board 14, and the bending edge 2201 is opened with a threaded hole. The screw 7 passes through the fixing hole on the fourth frame board 14 and is screwed into the threaded hole on the bending edge 2201, so as to realize the fixation between the outer frame 1 and the backplane 220.

Figure 2:
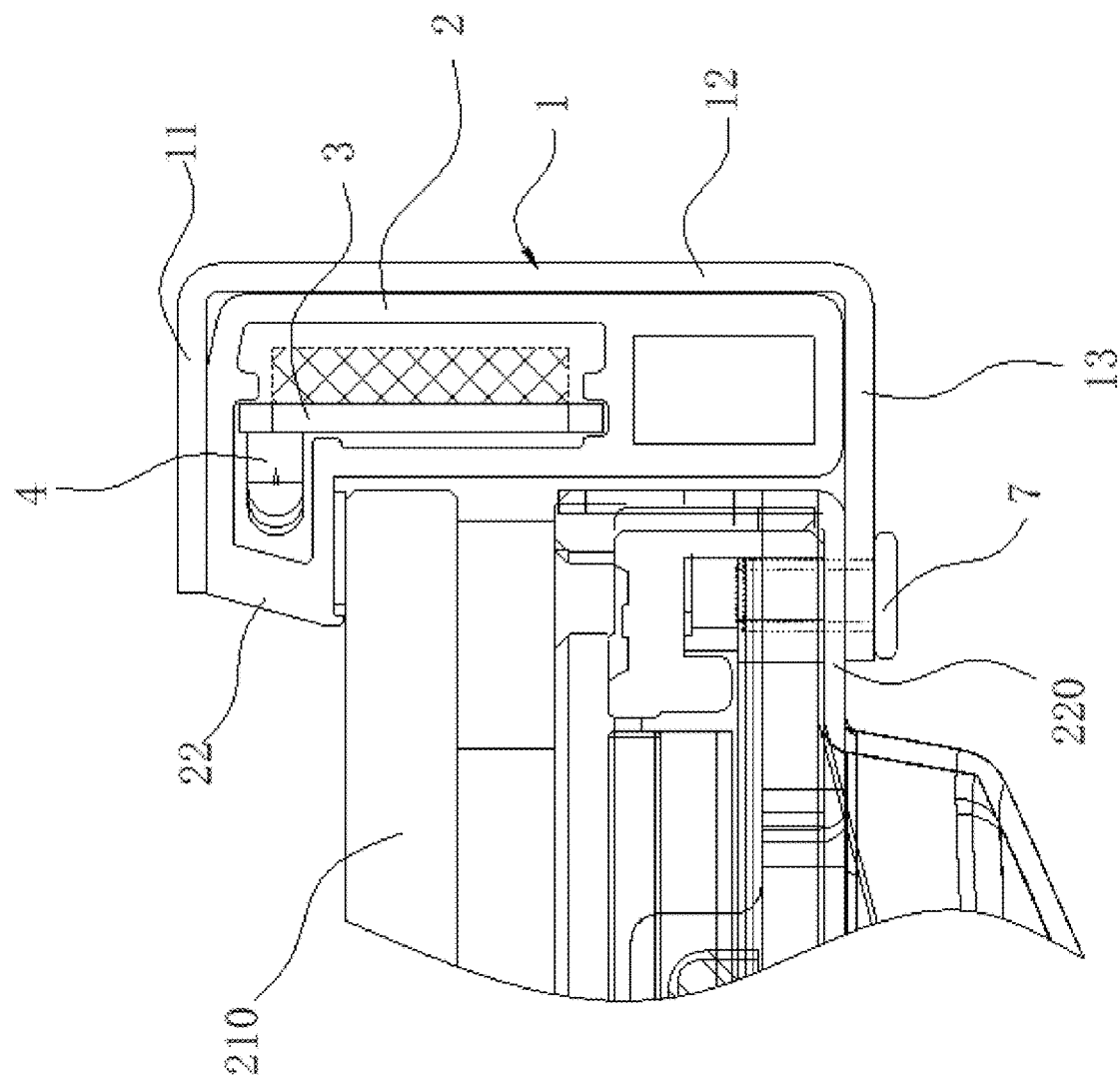
FIG. 2 is a schematic cross-sectional view of a touch screen according to a second embodiment of the present disclosure.

As shown in FIG. 2, the structure of this embodiment is similar to the structure of the embodiment in FIG. 1. Specifically, the outer frame 1 of this embodiment is provided with no fourth frame board 14, and the backplane 220 is provided with no bending edge 2201, either. The third frame board 13 is directly laid on a side surface of the backplane 220 away from the cover plate 210, and both are connected by screw 7 to achieve fixation.

Figure 3:
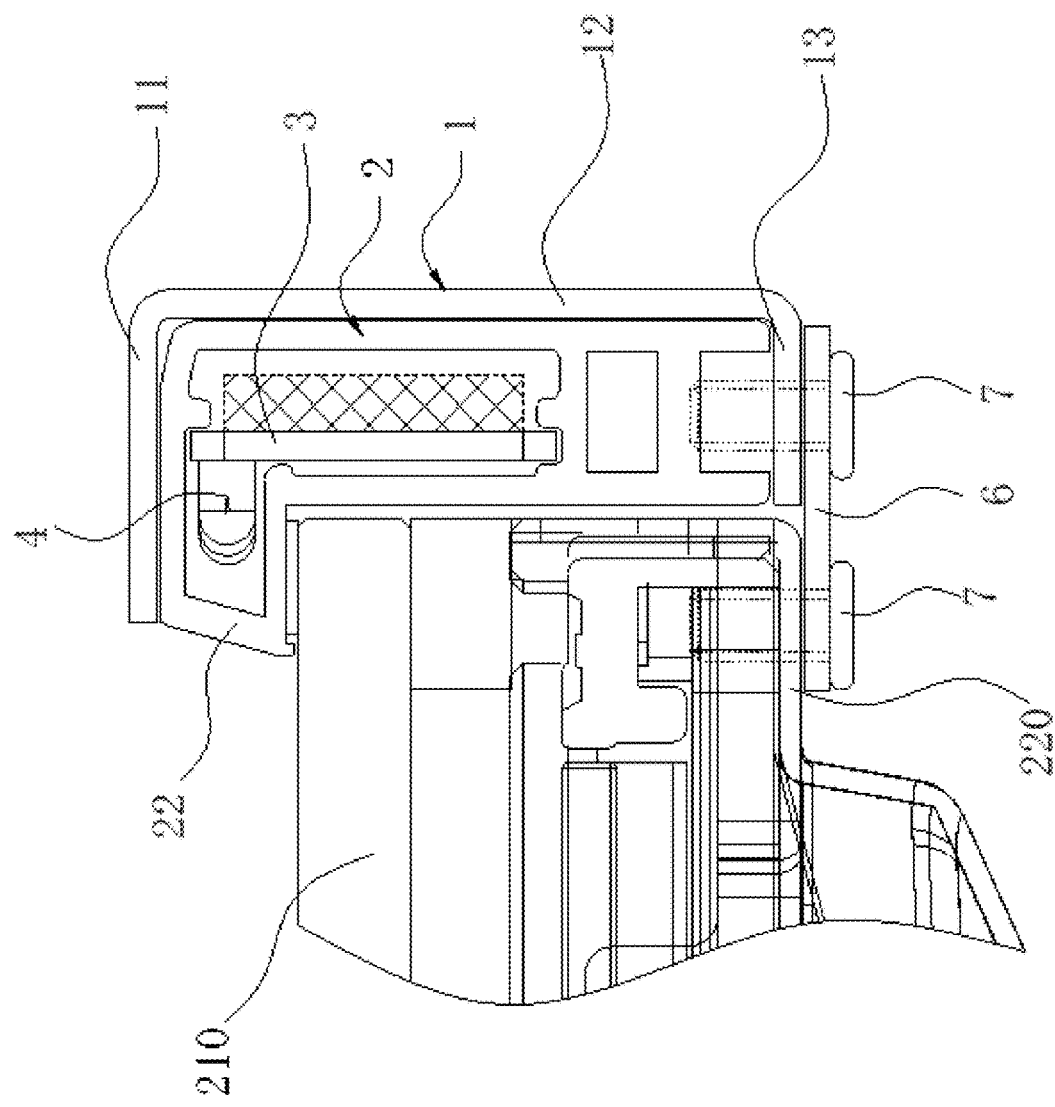
FIG. 3 is a schematic cross-sectional view of a touch screen according to a third embodiment of the present disclosure.

As shown in FIG. 3, in this embodiment, the outer frame 1 is provided with no fourth frame board 14, the third frame board 13 is directly flush with the backplane 220, and the outer frame 1 and the backplane 220 are connected by an adapter 6. Specifically, the adapter 6 is in a shape of a flat plate. One end of the adapter 6 is laid on a side surface of the third frame board 13 away from the first frame board 11, and the other end is laid on a side surface of the backplane 220 away from an optical film assembly. The adapter 6 is respectively connected with the third frame board 13 and the backplane 220 by screws 7.

Figure 4:
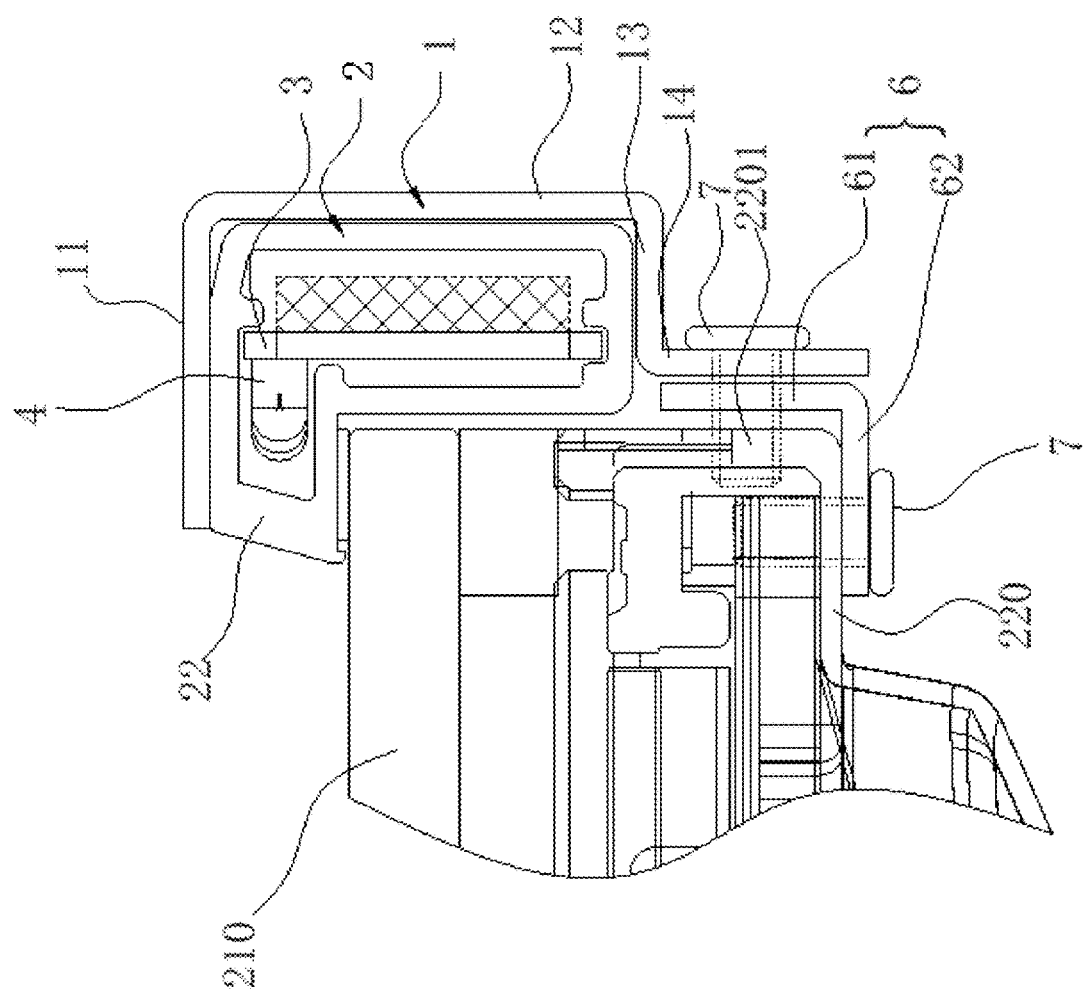
FIG. 4 is a schematic cross-sectional view of a touch screen according to a fourth embodiment of the present disclosure.

As shown in FIG. 4, the outer frame 1 is also connected with the backplane 220 through an adapter 6, but the structure of the adapter 6 in this embodiment is different from the structure of the adapter 6 in the embodiment of FIG. 3. In this embodiment, the outer frame 1 is provided with a fourth frame board 14 as shown in FIG. 1, and the edge of the backplane 220 is also bent with a bending edge 2201. The bending edge 2201 is arranged at intervals with the fourth frame board 14. The adapter 6 is L-shaped, and includes a first adapter plate 61 and a second adapter plate 62 that are connected vertically. The first adapter plate 61 is arranged between the bending edge 2201 and the fourth frame board 14, and the first adapter plate 61 is opened with a through hole for the screw 7 to pass through. The screw 7 passes through the fixing hole on the fourth frame board 14 and the through hole on the first adapter plate 61, and is screwed into the threaded hole of the bending edge 2201, so as to connect the backplane 220 and the adapter 6 with the outer frame 1. The second adapter plate 62 is laid on a side surface of the backplane 220 away from the optical film assembly, and both are also fixed by the screw 7.

Figure 5:
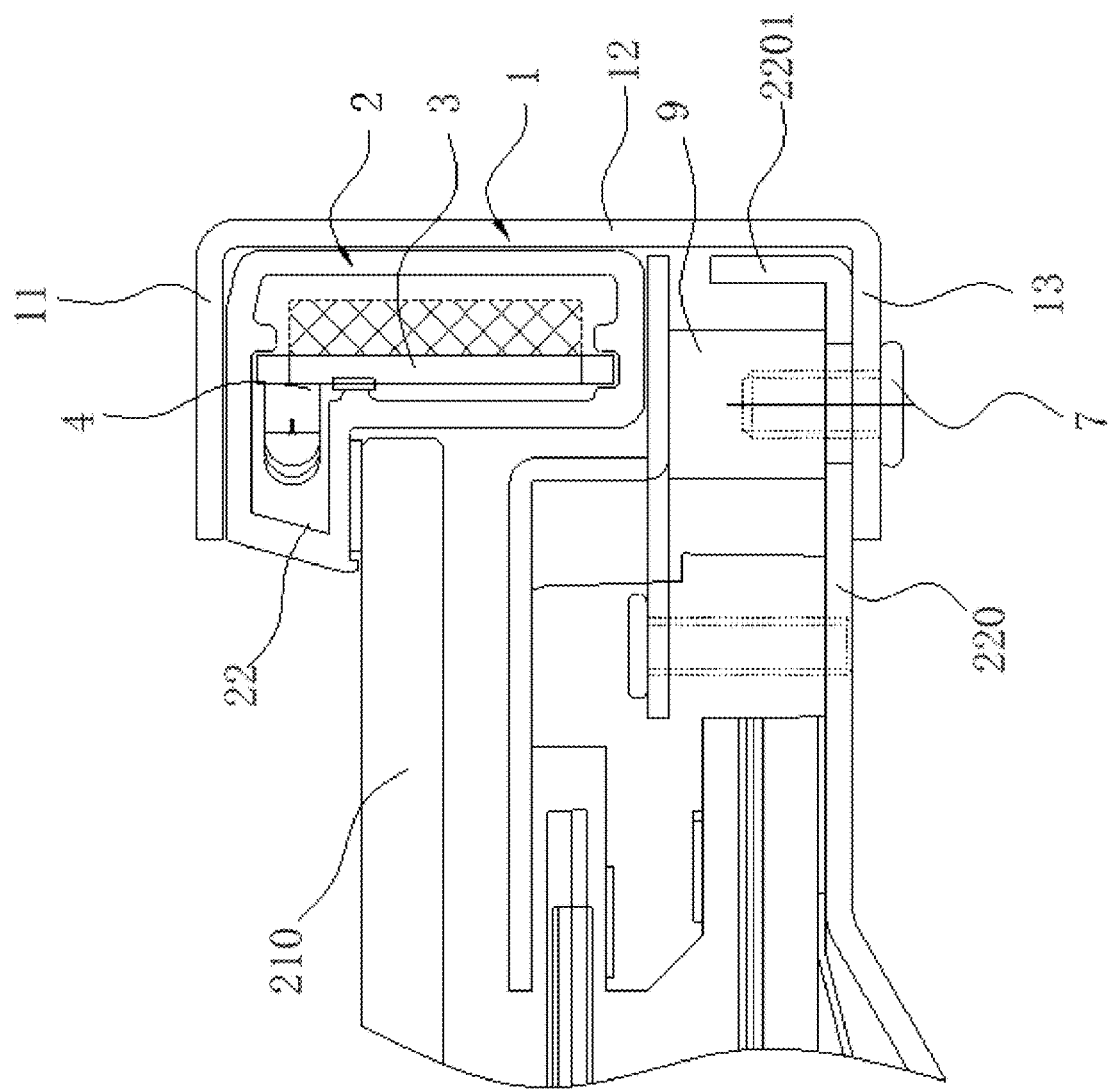
FIG. 5 is a schematic cross-sectional view of a touch screen according to a fifth embodiment of the present disclosure.

As shown in FIG. 5, in this embodiment, the outer frame 1 may include a first frame board 11, a second frame board 12, and a third frame board 13. The edge of the backplane 220 is bent toward the cover plate 210 to form a bending edge 2201, the third frame board 13 is arranged on a side surface of the backplane 220 away from the cover plate 210, and the bending edge 2201 abuts against a side surface of the second frame board 12 close to the center of the display module 200. A fixing post 9 is provided at a position of the backplane 220 close to a side of the cover plate 210 and adjacent to the bending edge 2201. The fixing post 9 can be fixed by riveting, bonding, welding, etc. The fixing post 9 is opened with a threaded hole, and the backplane 220 and the third frame board 13 are respectively opened with a through hole and a fixing hole corresponding to the threaded hole. The screw 7 passes through the fixing hole on the third frame board 13 and the through hole on the backplane 220, and is screwed into the threaded hole of the fixing post 9 to realize a fixing connection.

Figure 6:
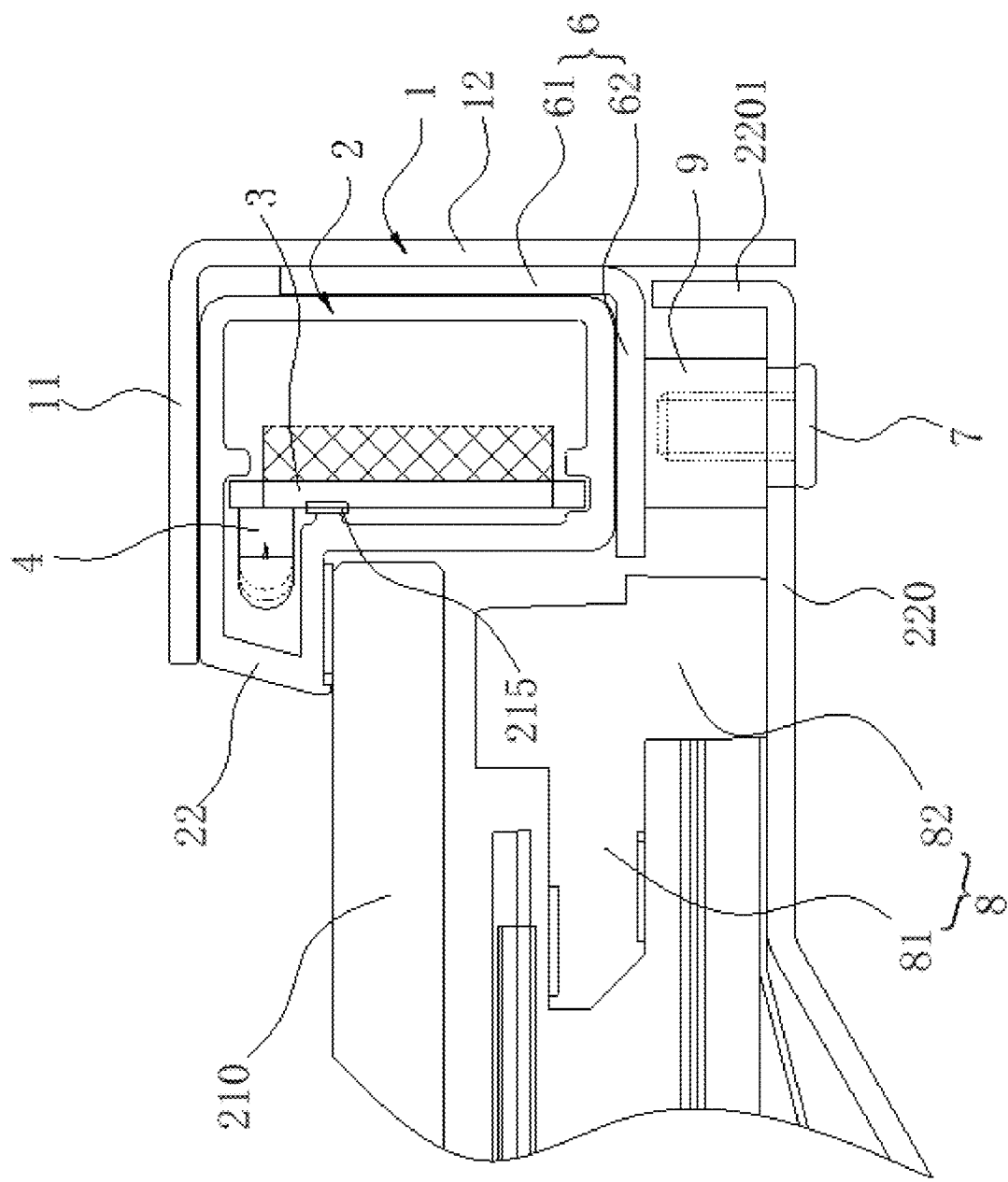
FIG. 6 is a schematic cross-sectional view of a touch screen according to a sixth embodiment of the present disclosure.

As shown in FIG. 6, in this embodiment, the structure of the outer frame 1 is different from the structures of the outer frame 1 in the embodiments of FIGS. 1 to 5. The outer frame 1 may include a first frame board 11 and a second frame board 12 that are arranged vertically, the edge of the backplane 220 is bent with a bending edge 2201, and the backplane 220 and the outer frame 1 are connected by an L-shaped adapter 6. The adapter 6 includes a first adapter plate 61 and a second adapter plate 62 that are connected vertically. The first adapter plate 61 is arranged between the light filtering member 2 and the second frame board 12. The second adapter plate 62 is configured to support the light filtering member 2, and the second adapter plate 62 is fixedly provided with a fixing post 9 on a side surface deviating from the light filtering member 2. The fixing post 9 is opened with a threaded hole, the backplane 220 is opened with a through hole corresponding to the threaded hole, and the screw 7 passes through the through hole on the backplane 220, and is screwed into the threaded hole of the fixing post 9 on the second adapter plate 62. Since the second frame board 12 and the light filtering member 2 grip the first adapter plate 61, the position of the adapter member 6 is limited, and then in cooperation with the structure of the screw 7 on the second adapter plate 62, a good fixation is realized.

In this embodiment, the bending edge 2201 may be arranged adjacent to the second frame board 12, or may be abutted against a side surface of the second frame board 12 close to the light filtering member 2.

The touch frame 100 further includes a middle frame 8. The middle frame 8 is configured to abut the optical film assembly of the display module 200 against the backplane 220, and is further configured to support the cover plate 210. The middle frame 8 includes a support portion 81 and the connecting portion 82 that are connected vertically. The support portion 81 is configured to support the cover plate 210 and press the optical film assembly. The connecting portion 82 is arranged on the backplane 220 and is close to the bending edge 2201. The fixing post 9 is located between the connecting portion 82 and the bending edge 2201. The middle frame 8 can be fixed on the backplane 220 by means of screw connection, adhesive bonding or the like.

Figure 7:
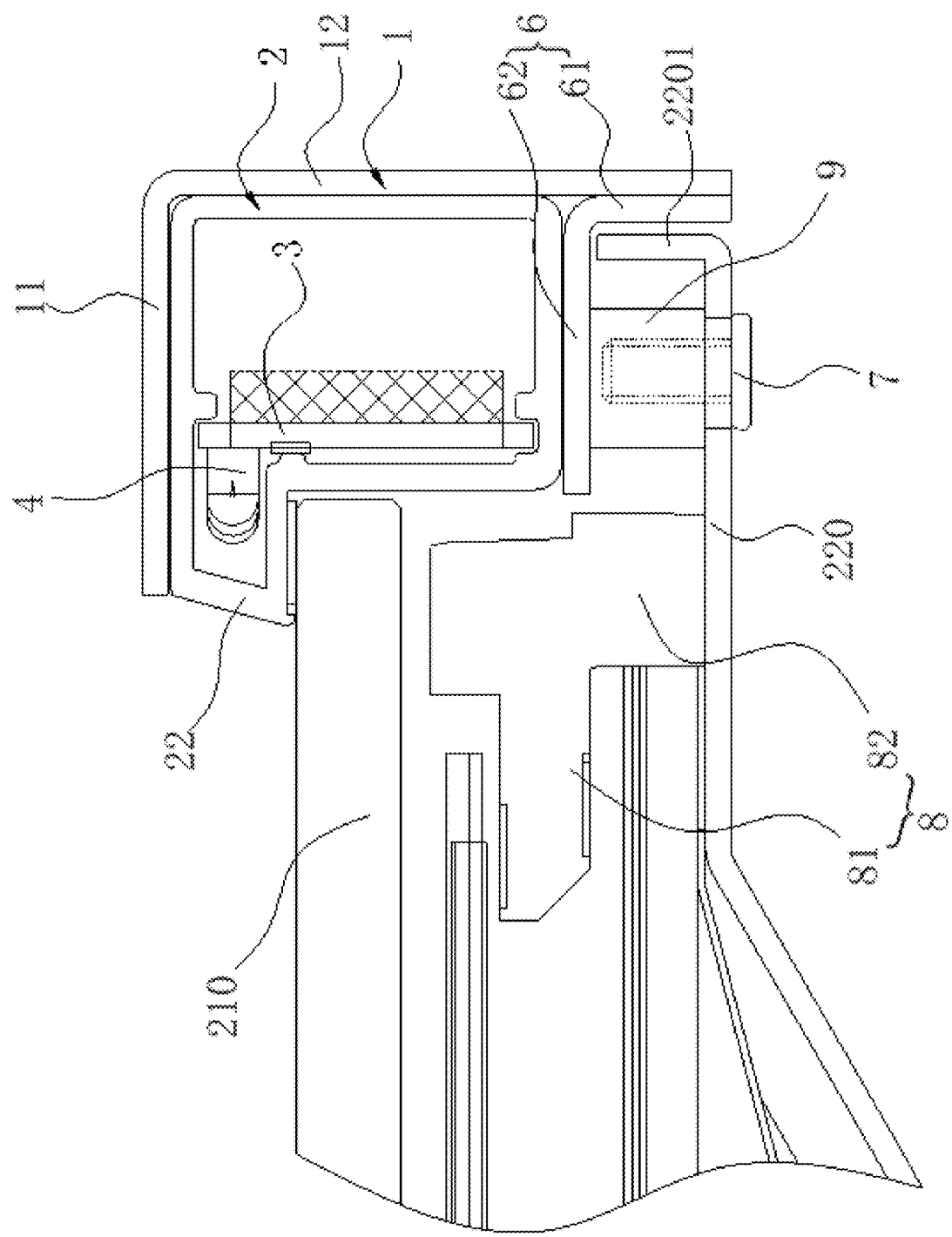
FIG. 7 is a schematic cross-sectional view of a touch screen according to a seventh embodiment of the present disclosure.

As shown in FIG. 7, the structure of this embodiment is similar to the structure of the embodiment in FIG. 6. Specifically, the first adapter plate 61 of the adapter 6 of this embodiment is arranged between the bending edge 2201 and the second frame board 12.

Figure 8:
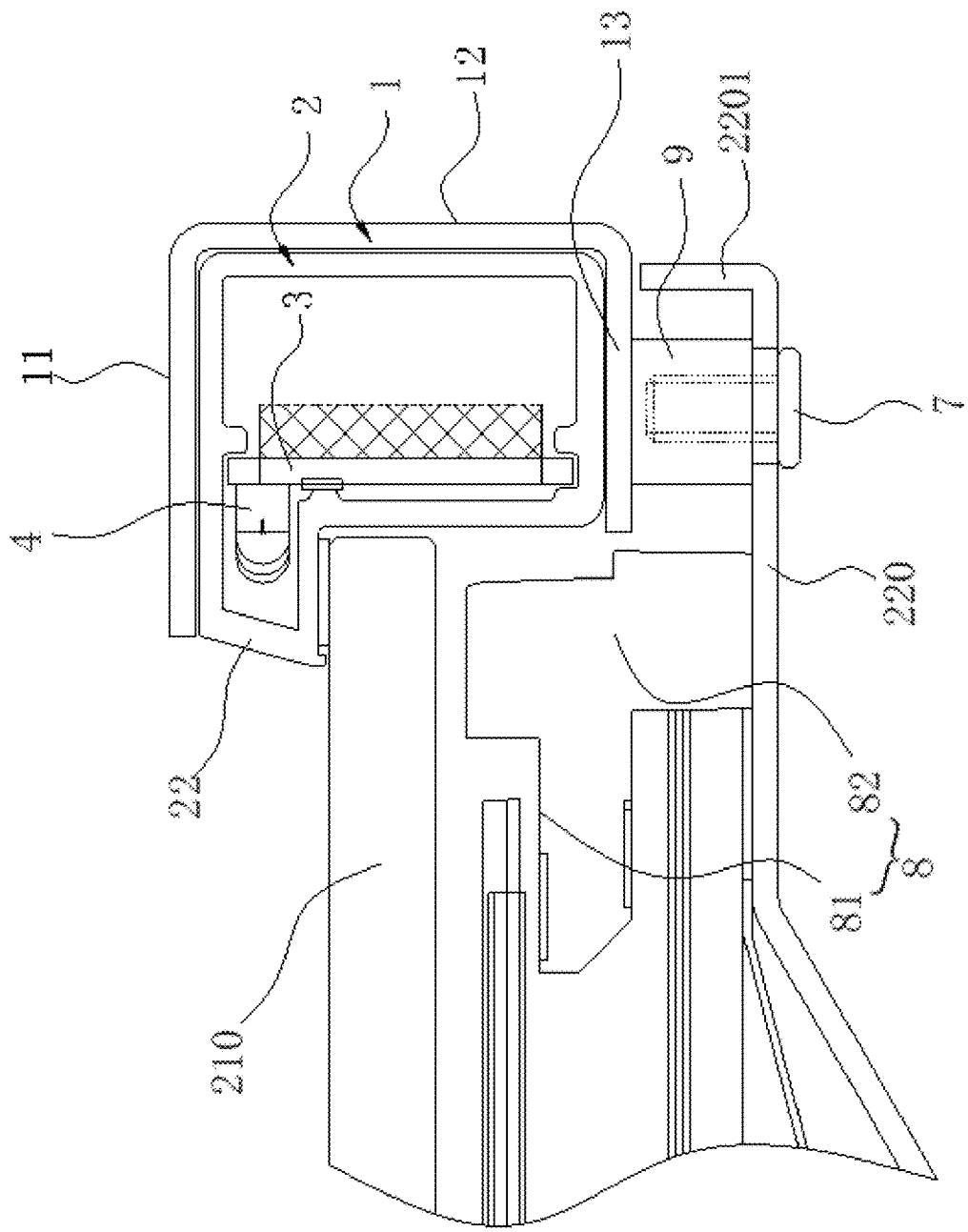
FIG. 8 is a schematic cross-sectional view of a touch screen according to an eighth embodiment of the present disclosure.

As shown in FIG. 8, in this embodiment, the outer frame 1 is U-shaped, that is, the outer frame 1 may include a first frame board 11, a second frame board 12, and a third frame board 13. An edge of the backplane 220 is bent towards the cover plate 210 to form a bending edge 2201, the third frame board 13 is arranged on and spaced apart from a side surface of the backplane 220 close to the cover plate 210, and a fixing post 9 is fixed on a side surface of the third frame board 13 close to the backplane 220. The fixing post 9 is opened with a threaded hole, the backplane 220 is opened with a through hole, and the through hole is arranged adjacent to the bending edge 2201. The screw 7 passes through the through hole on the backplane 220 and is screwed into the threaded hole of the fixing post 9, so as to realize the fixation between the backplane 220 and the outer frame 1. A suspended end of the bending edge 2201 can be abutted against the third frame plate 13, or arranged at intervals with the third frame board 13.

Figure 9:
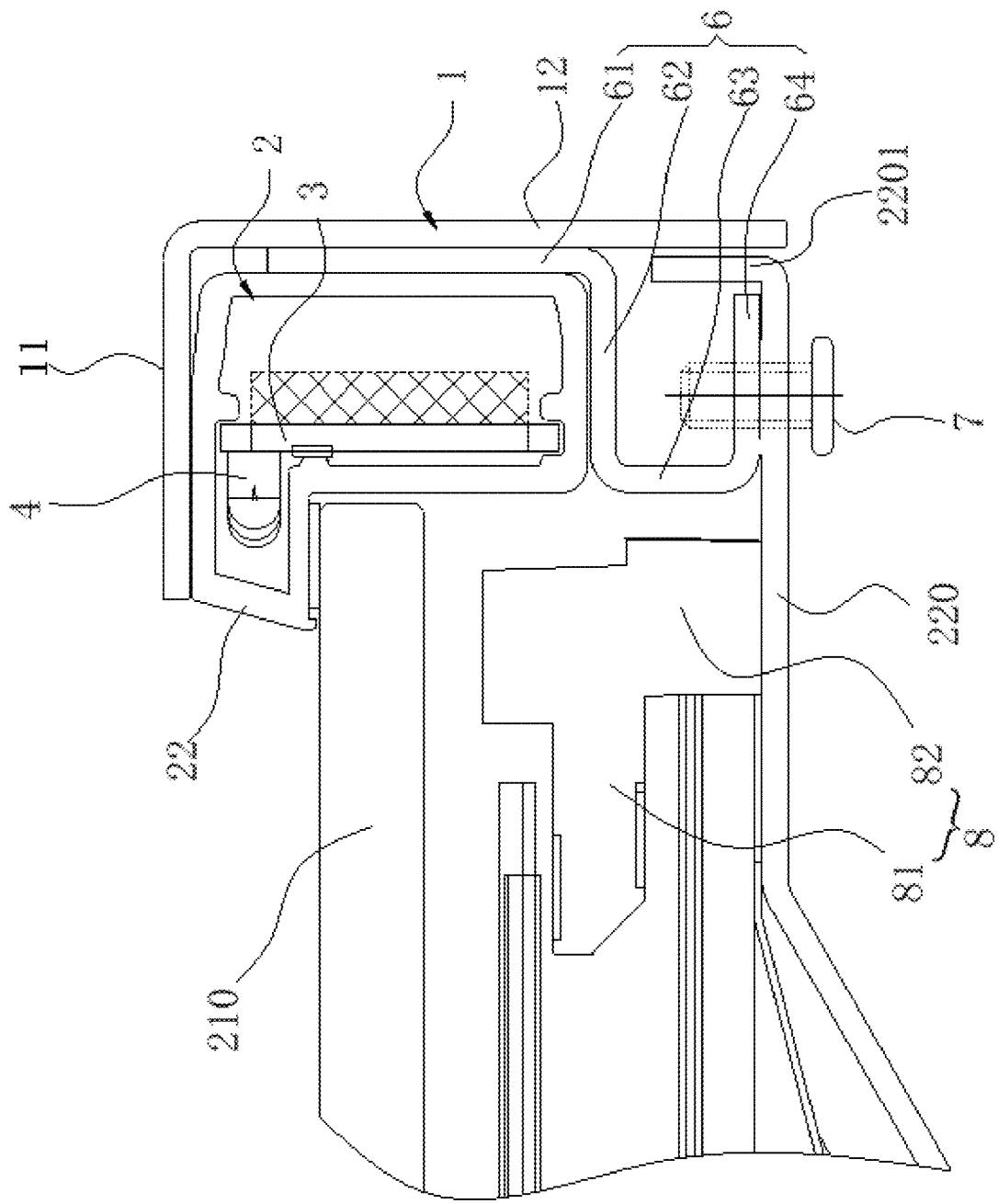
FIG. 9 is a schematic cross-sectional view of a touch screen according to a ninth embodiment of the present disclosure.

As shown in FIG. 9, the structure of the outer frame 1 of this embodiment is the same as the structures of the outer frame 1 in the embodiments of FIGS. 6 and 7, and the outer frame 1 may include a first frame board 11 and a second frame board 12 that are arranged vertically. An edge of the backplane 220 is bent with a bending edge 2201. The backplane 220 and the outer frame 1 are connected by an adapter 6, and the adapter 6 includes a first adapter plate 61 sandwiched between the light filtering member 2 and the second frame board 12, a second adapter plate 62 abutting against a side surface of the light filtering member 2 away from the first frame board 11, a fourth adapter plate 64 parallel to and spaced apart from the second adapter plate 62, and a third adapter plate 63 connecting the second adapter plate 62 and the fourth adapter plate 64, wherein the fourth adapter plate 64 is connected with the backplane 220 by a screw 7, and the bending edge 2201 is provided between the fourth adapter plate 64 and the second frame board 12.

In this embodiment, an end of the third adapter plate 63 is connected with an end of the second adapter plate 62 away from the first adapter plate 61, and the other end of the third adapter plate 63 is connected with an end of the fourth adapter plate 64 away from the bending edge 2201. The four adapter plates are connected vertically in sequence.

Figure 10:
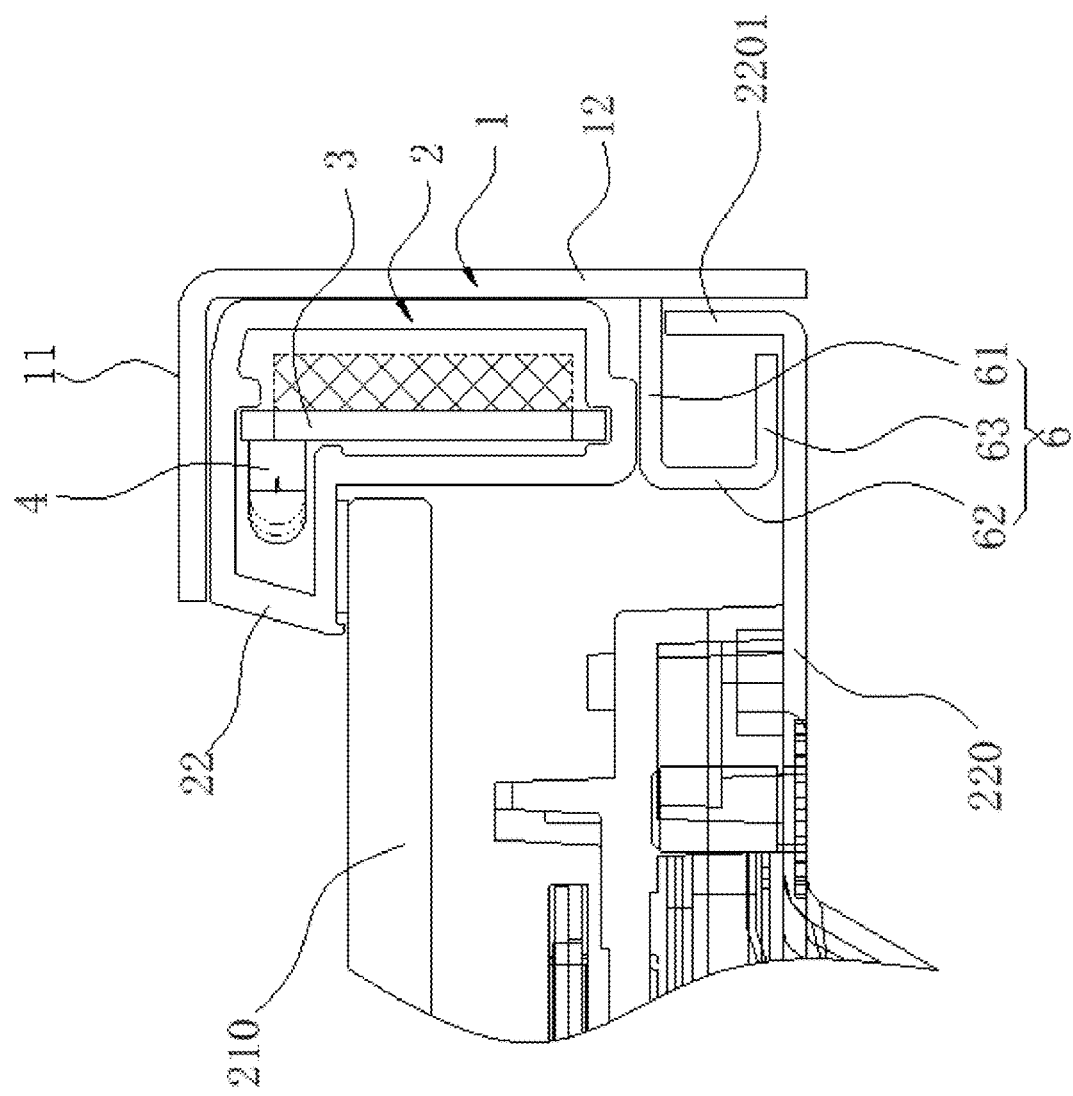
FIG. 10 is a schematic cross-sectional view of a touch screen according to a tenth embodiment of the present disclosure.

As shown in FIG. 10, the structure of this embodiment is similar to the structure of the embodiment in FIG. 9. Specifically, the structures of the adapters 6 are different. In this embodiment, the adapter 6 is U-shaped, and the adapter 6 includes a first adapter plate 61, a second adapter plate 62 and a third adapter plate 63 that are connected vertically in sequence. Both the first adapter plate 61 and the third adapter plate 63 are arranged on the same side of the second adapter plate 62. The first adapter plate 61 abuts against a side surface of the light filtering member 2 away from the first frame board 11. An end of the first adapter plate 61 away from the second adapter plate 62 is welded on a side surface of the second frame board 12 close to the display module 200. An end of the third adapter plate 63 away from the second adapter plate 62 is spaced apart from the second frame board 12, and there is a space for the bending edge 2201 of the backplane 220 to be inserted between them.

Figure 11:
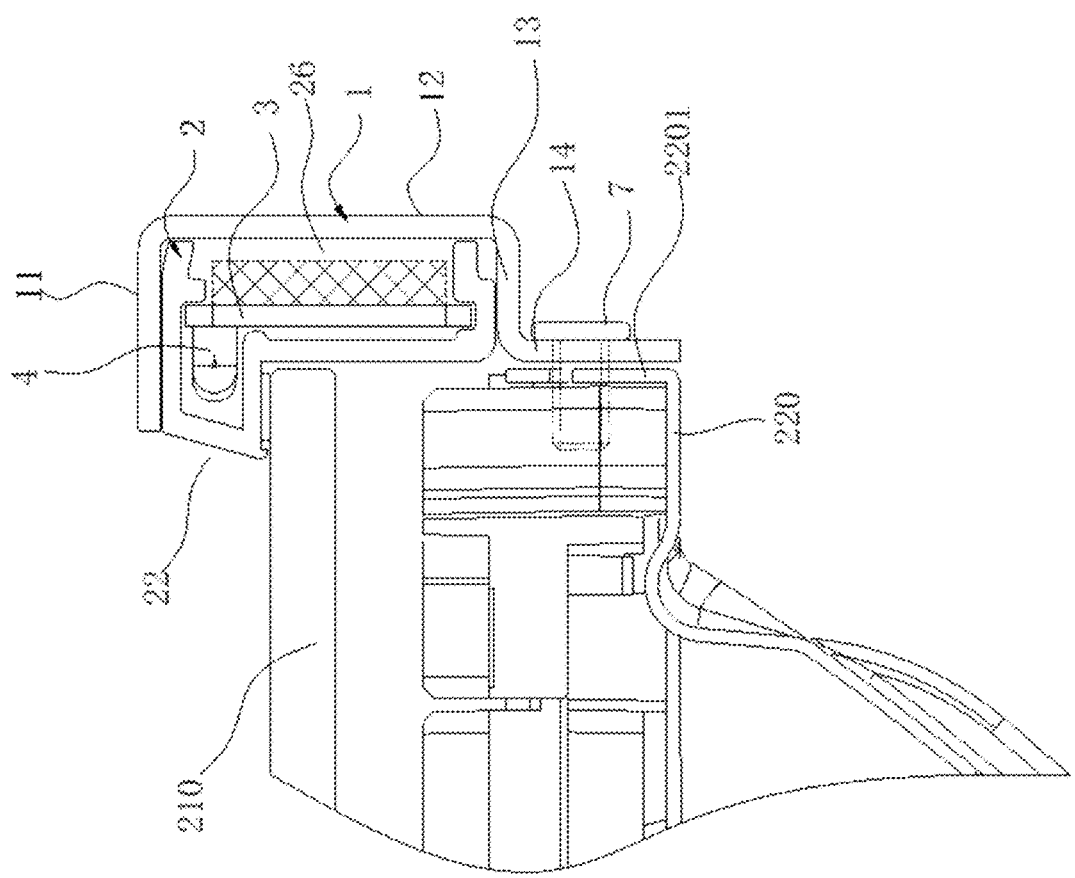
FIG. 11 is a schematic cross-sectional view of a touch screen according to an eleventh embodiment of the present disclosure.

As shown in FIG. 11, the structure of this embodiment is similar to the structure of the embodiment in FIG. 1. Specifically, a second opening 26 is opened on a side surface of the light filtering member 2 close to the second frame board 12, and the second opening 26 is in communication with the accommodating cavity 21. This structure can omit the first opening opened on an end portion of the light filtering member 2 in length direction and directly assemble the printed circuit board 3 from the second opening 26. This structure can reduce the overall manufacturing difficulty of the light filtering member 2, and can also reduce the weight of the entire touch frame 100, which facilitates the realization of a thin and light design of touch screen.

The embodiment of the present disclosure further provides a touch screen, including a display module 200 and a side frame arranged on a periphery of the display module 200, the side frame adopts the touch frame 100 of any one of the above embodiments, and the specific structure of the touch frame 100 will not be repeated herein.

In this embodiment, the printed circuit board 3 of the touch frame 100 is perpendicular to the display side of the cover plate 210 of the display module 200. By arranging the printed circuit board 3 to be perpendicular to the display side of the cover plate 210, the width of the touch frame 100 can be reduced while reducing the thickness of the entire touch frame 100, so as to meet the design requirements of a narrow frame.

It goes without saying that the printed circuit board 3 is not limited to being perpendicular to the display side of the cover plate 210, and can also be arranged obliquely to the display side of the cover plate 210. In this embodiment, the cover plate 210 is made of tempered glass.

In the description of this description, it should be understood that the term "above" and other orientations or positional relationships are based on the orientations or positional relationships shown in the drawings, and are only for ease of description and simplified operations, and do not indicate or imply that the related device or element must have a specific orientation, be constructed and operated in a specific orientation, which therefore cannot be construed as a limitation of the present disclosure.

In the description of this description, the description with reference to the term "an embodiment" or the like means that a specific feature, structure, material, or characteristic of the embodiment is included in at least one embodiment or example of the present disclosure. In this description, the schematic representations of the above-mentioned terms do not necessarily refer to the same embodiment.

In addition, it should be understood that although this description is described in accordance with the implementation approaches, not each implementation approach only contains an independent technical solution. This narration in the description is only for clarity of the device, and those skilled in the art should regard the description as a whole. The technical solutions in the various embodiments can also be appropriately combined to form other implementation approaches that can be understood by those skilled in the art.

The technical principles of the present disclosure have been described above in conjunction with specific embodiments. These descriptions are only for describing the principle of the present disclosure, and cannot be interpreted as a limitation of the claimed scope of the present disclosure in any way. Based on the description herein, those skilled in the art can think of other specific implementation approaches of the present disclosure without creative work, and these approaches will fall within the claimed scope of the present disclosure.

What is claimed is:

1. A touch frame, comprising:
an outer frame having an accommodating groove, wherein the accommodating groove comprises at least one groove opening;
a light filtering member arranged in the accommodating groove and provided with an accommodating cavity, wherein a part, extending to the groove opening of the accommodating groove, of the light filtering member is a light filtering portion; and a printed circuit board arranged in the accommodating cavity and provided with a light receiving or transmitting device, wherein the light receiving or transmitting device is directly opposite to the light filtering portion, wherein a width direction of the printed circuit board is perpendicular to a display side of a cover plate of a display module, wherein the outer frame comprises a first frame board, a second frame board, and a third frame board that are connected vertically in sequence, both the first frame board and the third frame board are located on a side, facing the cover plate of the display module, of the second frame board, the first frame plate is arranged on and spaced apart from a display side of the cover plate, and the accommodating groove is formed among the first frame board, the second frame board, and the third frame board, wherein a fixing post is provided on a side, away from the first frame board, of the third frame board, and the fixing post is provided with a fixing hole.

2. The touch frame according to claim 1, wherein an adhesive layer is provided on a side surface, close to the display side of the cover plate of the display module, of the light filtering member.

3. The touch frame according to claim 1, wherein a length of the light filtering member extends along a length direction of a side edge on which the display module is provided with the outer frame, at least one end of the light filtering member in a length direction comprises a first opening, the first opening is in communication with the accommodating cavity, and the printed circuit board is inserted into the accommodating cavity through the first opening.

4. The touch frame according to claim 3, wherein two opposite first cavity walls of the accommodating cavity are provided with holders, the first cavity walls are parallel to the display side of the cover plate of the display module, the holders extend to the first opening along the length direction of the light filtering member, and the opposite ends of the printed circuit board are respectively clamped in the holders.

5. The touch frame according to claim 4, wherein the accommodating cavity further comprises a second cavity wall perpendicular to the first cavity walls, a side surface of the printed circuit board on which the light receiving or transmitting device is provided is a first side surface, the second cavity wall is arranged on and spaced apart from a side of the first side surface, and the second cavity wall is protrudingly provided with an abutting portion, and
wherein the abutting portion abuts against the first side surface, and a buffer pad is arranged between the abutting portion and the printed circuit board.

6. The touch frame according to claim 1, wherein the light filtering member comprises a first part and a second part arranged at an angle, a notch is formed between the first part and the second part, the light filtering portion is arranged on an end surface of the first part away from the second part, a side surface of the first part located in the notch is bonded to the display side of the cover plate of the display module, and a side surface of the second part located in the notch is spaced apart from or in contact with an end surface of the display module, wherein the first part is provided with a first chamber, the second part is provided with a second chamber, the first chamber and the second chamber are in communication to jointly form the accommodating cavity, the printed circuit board is arranged in the second chamber, and the light receiving or transmitting device is arranged in the first chamber.

7. The touch frame according to claim 1, wherein the third frame board is provided with the fixing hole for a screw to pass through.

8. The touch frame according to claim 1, wherein the outer frame further comprises a fourth frame board, wherein the fourth frame board and the second frame board are respectively located on two opposite sides of the third frame board, and the fourth frame board is provided with the fixing hole.

9. The touch frame according to claim 1, wherein the outer frame is provided with an adapter, and the adapter is configured to connect the outer frame and a backplane of the display module.

10. The touch frame according to claim 1, wherein the light filtering member is provided with a second opening, the second opening is directly opposite to a side surface, deviating from the light receiving or transmitting device, of the printed circuit board, and the second opening is in communication with the accommodating cavity.

11. A touch screen, comprising:
a display module; and
a side frame arranged on a periphery of the display module, wherein the side frame is a touch frame comprising:
an outer frame having an accommodating groove, wherein the accommodating groove being opened with at least one groove opening;
a light filtering member arranged in the accommodating groove and provided with an accommodating cavity, wherein a part, extending to the groove opening of the accommodating groove, of the light filtering member is a light filtering portion; and
a printed circuit board arranged in the accommodating cavity and provided with a light receiving or transmitting device, wherein the light receiving or transmitting device is directly opposite to the light filtering portion, wherein a width direction of the printed circuit board of the touch frame is perpendicular to a display side of a cover plate of the display module,
wherein the groove opening of the accommodating groove is arranged toward a center of the display module, and
wherein the light filtering portion is located between the outer frame and the display side of the cover plate.

12. The touch screen according to claim 11, wherein an adhesive layer is provided on a side surface, close to the display side of the cover plate of the display module, of the light filtering member, wherein a length of the light filtering member extends along a length direction of a side edge on which the display module is provided with the outer frame, at least one end of the light filtering member in a length direction is opened with a first opening, the first opening is in communication with the accommodating cavity, and the printed circuit board is inserted into the accommodating cavity through the first opening, wherein two opposite first cavity walls of the accommodating cavity are provided with holders, and the first cavity walls are parallel to the display side of the cover plate of the display module, the holders extend to the first opening along the length direction of the light filtering member, and the opposite ends of the printed circuit board are respectively clamped in the holders, and wherein the accommodating cavity further comprises a second cavity wall perpendicular to the first cavity walls, a side surface of the printed circuit board on which the light receiving or transmitting device is provided is a first side surface, the second cavity wall is arranged on and spaced apart from a side of the first side surface, and the second cavity wall is protrudingly provided with an abutting portion, and wherein the abutting portion abuts against the first side surface, and a buffer pad is arranged between the abutting portion and the printed circuit board.

13. The touch screen according to claim 11, wherein the light filtering member comprises a first part and a second part arranged at an angle, a notch is formed between the first part and the second part, the light filtering portion is arranged on an end surface of the first part away from the second part, a side surface of the first part located in the notch is bonded to the display side of the cover plate of the display module, and a side surface of the second part located in the notch is spaced apart from or in contact with an end surface of the display module.

14. The touch screen according to claim 13, wherein the first part is provided with a first chamber, the second part is provided with a second chamber, the first chamber and the second chamber are in communication to jointly form the accommodating cavity, the printed circuit board is arranged in the second chamber, and the light receiving or transmitting device is arranged in the first chamber.

15. The touch screen according to claim 11, wherein the outer frame comprises a first frame board, a second frame board, and a third frame board that are connected vertically in sequence, both the first frame board and the third frame board are located on a side, facing the cover plate of the display module, of the second frame board, the first frame plate is arranged on and spaced apart from the display side of the cover plate, and the accommodating groove is formed among the first frame board, the second frame board, and the third frame board, wherein the third frame board is provided with a fixing hole for a screw to pass through.

16. The touch screen according to claim 11, wherein the outer frame comprises a first frame board, a second frame board, and a third frame board that are connected vertically in sequence, both the first frame board and the third frame board are located on a side, facing the cover plate of the display module, of the second frame board, the first frame plate is arranged on and spaced apart from the display side of the cover plate, and the accommodating groove is formed among the first frame board, the second frame board, and the third frame board, wherein a fixing post is provided on a side, away from the first frame board, of the third frame board, and the fixing post is provided with the fixing hole.

17. The touch screen according to claim 11, wherein the outer frame comprises a first frame board, a second frame board, and a third frame board that are connected vertically in sequence, both the first frame board and the third frame board are located on a side, facing the cover plate of the display module, of the second frame board, the first frame plate is arranged on and spaced apart from the display side of the cover plate, and the accommodating groove is formed among the first frame board, the second frame board, and the third frame board, wherein the outer frame further comprises a fourth frame board, wherein the fourth frame board and the second frame board are respectively located on two opposite sides of the third frame board, and the fourth frame board is provided with the fixing hole.

18. The touch screen according to claim 11, wherein the outer frame is provided with an adapter, and the adapter is configured to connect the outer frame and a backplane of the display module.

19. The touch screen according to claim 11, wherein the light filtering member is provided with a second opening, the second opening is directly opposite to a side surface, deviating from the light receiving or transmitting device, of the printed circuit board, and the second opening is in communication with the accommodating cavity.

\* \* \* \* \*